(12) United States Patent
Geisow et al.

(10) Patent No.: US 9,459,492 B2
(45) Date of Patent: Oct. 4, 2016

(54) DISPLAY WITH BACKLIGHT

(75) Inventors: Adrian Derek Geisow, Portishead (GB); Stephen Christopher Kitson, Alveston (GB); Gary Alfred Gibson, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 42 days.

(21) Appl. No.: 13/643,073

(22) PCT Filed: Apr. 23, 2010

(86) PCT No.: PCT/US2010/032159
§ 371 (c)(1),
(2), (4) Date: Oct. 23, 2012

(87) PCT Pub. No.: WO2011/133161
PCT Pub. Date: Oct. 27, 2011

(65) Prior Publication Data
US 2013/0044463 A1   Feb. 21, 2013

(51) Int. Cl.
*G09F 13/10* (2006.01)
*G02F 1/1335* (2006.01)

(52) U.S. Cl.
CPC ... *G02F 1/133617* (2013.01); *G02F 1/133514* (2013.01); *G02F 1/133603* (2013.01); *G02F 2001/133614* (2013.01)

(58) Field of Classification Search
CPC .................. G02F 1/133617; G02F 1/133603; G02F 1/133514; G02F 2001/133614
USPC ........ 362/84, 600–634, 97.1–97.4, 230, 231, 362/293
See application file for complete search history.

(56) References Cited

U.S. PATENT DOCUMENTS 6,806,644 B2   10/2004   Ueno et al.
7,123,796 B2   10/2006   Steckl et al.
(Continued)

FOREIGN PATENT DOCUMENTS

CN   1602444   3/2005
CN   1854853   11/2006
(Continued)

OTHER PUBLICATIONS

International Search Report and Written Opinion of the International Searching Authority, mailed Feb. 23, 2011, , issued in related PCT Application No. PCTIUS2010/032159.
(Continued)

*Primary Examiner* — Diane Lee
*Assistant Examiner* — Mitchell Errett
(74) *Attorney, Agent, or Firm* — Douglas L. Weller

(57) ABSTRACT

A display includes a backlight (40). In addition, the display includes for each of at least one wavelength band, a plurality of layers placed above the backlight (40). The plurality of layers includes an absorption layer (13,23,33), a luminescent layer (14,24,34) and a reflective layer (15,25,35). The absorption layer (12,22,32) is capable of absorbing light in a wavelength band while being substantially transparent to light in other wavelength bands. The luminescent layer (14,24,34) is capable, in response to light from the backlight (40), of emitting light within the wavelength band. The reflective layer (15,25,35) is adapted to reflect light in the wavelength band while being substantially transparent to light in other wavelength bands.

15 Claims, 2 Drawing Sheets

(56) References Cited

U.S. PATENT DOCUMENTS

| | | | |
|---|---|---|---|
| 7,182,498 B2 | 2/2007 | Schultz et al. | |
| 7,486,354 B2 | 2/2009 | Chang et al. | |
| 7,654,681 B2* | 2/2010 | Kim et al. | 362/97.4 |
| 2003/0197820 A1* | 10/2003 | Hiji et al. | 349/115 |
| 2006/0240286 A1* | 10/2006 | Park et al. | 428/690 |
| 2006/0274226 A1* | 12/2006 | Im et al. | 349/71 |
| 2007/0047254 A1* | 3/2007 | Schardt et al. | 362/607 |
| 2009/0027872 A1* | 1/2009 | Debije et al. | 362/84 |
| 2009/0073540 A1* | 3/2009 | Kothari et al. | 359/291 |
| 2009/0140961 A1 | 6/2009 | Geisow et al. | |
| 2009/0147497 A1* | 6/2009 | Nada | 362/84 |
| 2010/0033947 A1* | 2/2010 | Lin et al. | 362/84 |
| 2010/0118243 A1* | 5/2010 | Majumdar et al. | 349/122 |

FOREIGN PATENT DOCUMENTS

| | | |
|---|---|---|
| CN | 101297234 | 10/2008 |
| CN | 101451673 | 6/2009 |
| EP | 2068193 A2 | 6/2009 |
| JP | H08-313899 | 11/1996 |
| JP | 2001124918 A | 10/1999 |
| JP | 2002-072195 A | 3/2002 |
| JP | 2006-048007 A | 2/2006 |
| JP | 2008-145890 A | 6/2008 |
| JP | 2009-506501 A | 2/2009 |
| TW | 200821664 | 5/2008 |

OTHER PUBLICATIONS

Chinese Office Action dated Sep. 15, 2014 cited in Appl. No. 201080067614.4; 7 pages.

EPO; "Supplementary European Search Report" cited in Appl. No. 10850382 dated Apr. 18, 2014; 5 pages.

* cited by examiner

DISPLAY WITH BACKLIGHT

BACKGROUND

Reflective displays typically use little power and are good for use in sunlight or bright indoor lighting. Because reflective displays are typically not lit, they perform less well when there is a lack of ambient light. Front lights can be used to light reflective displays, for example, by using a structured optical film to take light from the side of the display and direct it back to the display which reflects the light out to the user. Such optical film, however, is complex and can reduce the contrast of the display by scattering incoming light back to the user.

SUMMARY

In accordance with an embodiment of the invention, a display includes a backlight. In addition, the display includes for each of at least one wavelength band, a plurality of layers placed above the backlight. The plurality of layers includes an absorption layer, a luminescent layer and a reflective layer. The absorption layer is capable of absorbing light in a wavelength band while being substantially transparent to light in other wavelength bands. The luminescent layer is capable, in response to light from the backlight, of emitting light within the wavelength band. The reflective layer is adapted to reflect light in the wavelength band. FIG. 1 is a schematic sectional view of a reflective display device in accordance with an embodiment of the present invention.

DESCRIPTION OF EMBODIMENTS

Figure 1:
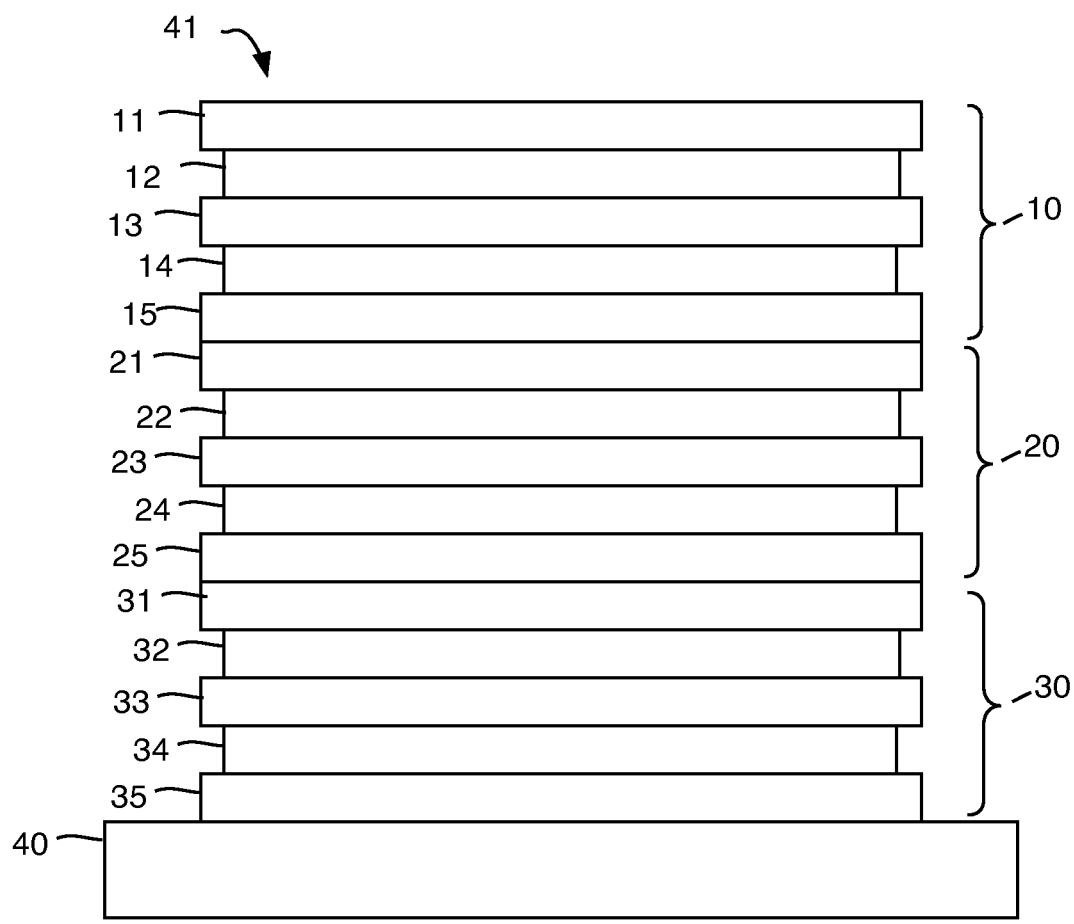
FIG. 1 is a schematic sectional view of a reflective display device in accordance with an embodiment of the present invention.

FIG. 1 is a schematic sectional view of a reflective display device 41 that includes a backlight 40. For example, backlight 40 provides ultraviolet (UV) light with a wavelength in the range of 300 to 380 nanometers or deep blue light with a wavelength in the range of 380 to 420 nanometers.

Reflective display device 40 includes absorption layers 12, 22 and 32, which can be made to absorb different colors of light. For example, absorption layers 12, 22 and 32 are electro-optical layers composed of selective light absorbing material such as dichroic dyes in liquid crystal hosts, electrophoretically actuated pigment particles, or another of known selective light absorbing material that can be controlled to change from transparent to absorbing colors in specific wavelength bands. For example the thickness of each of absorption layers 12, 22 and 32 is 3 micrometers.

Absorption layers 12, 22 and 32 are sandwiched between transparent conductive material. What is meant herein by transparent material is material that lets light through. Thus the term transparent material is meant to include translucent material where there is a significant amount of diffusion of light as well as clear transparent material where there is relatively little or even only a negligible amount of diffusion of light.

For example, absorption layer 12 is between a transparent conductive layer 11 and a transparent conductive layer 13. Absorption layer 22 is between a transparent conductive layer 21 and a transparent conductive layer 23. Absorption layer 32 is between a transparent conductive layer 31 and a transparent conductive layer 33. For example, each of transparent conductive layers 11, 13, 21, 23, 31 and 33 is 50 to 100 nanometers thick and is composed of, for example, indium tin oxide (ITO) or poly(3,4-ethylenedioxythiophene) poly(styrenesulfonate) (Pedot-PSS) or some other transparent conductive material known to those skilled in the art of display manufacture. The transparent conductive material carries electric control signals that control at what locations in the display the selected light band is absorbed.

As shown in FIG. 1, the transparent conductive layers are immediately adjacent to the corresponding absorption layer so as to minimize the voltages required for operation. In some cases, however, there may be intervening layers. For example, an alignment layer for the liquid crystals in a liquid crystal actuated dichroic dye guest-host system may separate an absorption layer from one or both of its corresponding transparent conductive layers.

Below absorption layers 12, 22 and 32 light is reflected at wavelengths absorbed by the above absorption layers. For example, the reflection of light is implemented by a plurality of reflective layers. A reflective layer 15 operates as a wavelength selective mirror. Reflective layer 15 is located below absorption layer 12 and selectively reflects light that can be absorbed by absorption layer 12. A reflective layer 25 operates as a wavelength selective mirror. Reflective layer 25 is located below absorption layer 22 and selectively reflects light that can be absorbed by absorption layer 22. Reflective layer 25 can optionally also reflect light that can be absorbed by layer 12 while not reflecting light that can be absorbed by layer 32. A reflective layer 35 operates as a wavelength selective mirror. Reflective layer 35 is located below absorption layer 32 and selectively reflects light that can be absorbed by absorption layer 32. Reflective layer 35 can optionally also reflect light that can be absorbed by layers 12 and by layers 22.

For example, the reflective layers 15, 25 and 35 are made from reactive mesogen cholesteric films. For example, Merck material RMSO3-008 can be used to selectively reflect blue light. Merck material RMSO3-010 can be used to selectively reflect green light. Merck material RMSO3-009 can be used to selectively reflect red light.

For more information on constructing reflective layers 15, 25 and 35, see United States Patent Application Publication 2009/0140961 A1, published Jun. 4, 2009 for a Reflective Display.

Immediately above each of reflective layers 15, 25 and 35 is placed a luminescent layer that when stimulated by light from backlight 40 emits light that is predominantly within the wavelength range that can be absorbed by the corresponding absorption layer. Thus, a luminescent layer 14 emits light within a wavelength band that is predominately within the wavelength range that can be absorbed by absorption layer 12. A luminescent layer 24 emits light within a wavelength band that is predominately within the wavelength range that can be absorbed by absorption layer 22. A luminescent layer 34 emits light within a wavelength band that is predominately within the wavelength range that can be absorbed by absorption layer 32. For example, the luminescent layers are either fluorescent or phosphorescent. For example, each of luminescent layers 14, 24 and 34 absorbs approximately one third of the light emitted by luminescent backlight 40. Alternatively, in accordance with design choices based on materials used and performance desired, luminescent layers 14, 24 and 34 can absorb disproportional amounts of the light emitted by luminescent back light 40. Luminophores within the luminescent layers can optionally be chosen to absorb some visible wavelengths rather than just the wavelength of light from the backlight if their emission efficiency is high enough and the emission between the primary colors can be balanced. Allowing this visible absorption can broaden the choice of luminescent materials. Reflective layers 15, 25 and 35 are substantially transparent at the wavelengths of light emitted from backlight 40 that stimulate the luminescent layers.

Composition of luminescent layers 14, 24 and 34 can be chosen based upon the composition of absorption layers 12, 22 and 32. For example, if in absorption layers 12, 22 and 32 an electrophoretic cell is used to sweep pigment in or out of the pixel area to achieve the color absorption, no polarization is needed in luminescent layers 14, 24 and 34. In this case luminescent layers 14, 24 and 34 can be composed of, for example, luminescent dye-doped transparent polymers or luminescent polymers or dendrimers having a thickness of 1-20 microns.

If absorption layers 12, 22 and 32 achieve color absorption based on polarization, luminescent layers 14, 24 and 34 may need to be polarized as well. This can be achieved by composing luminescent layers 14, 24 and 34 using dichroic fluorescent dyes, for example, which can be aligned in a curable liquid crystal polymer layer. Such dyes are described in XUELONG ZHANG; GOROHMARU Hideki; KADOWAKI Masami; KOBAYASHI Takako; ISHI-I Tsutomu; THIEMANN Thies; MATAKA Shuntaro; Benzo-2,1,3-thiadiazole-based, highly dichroic fluorescent dyes for fluorescent host-guest liquid crystal displays; Journal of Material Chemistry; ISSN 0959-9428 2004, vol. 15, no 12, pp. 1901-1904n.

FIG. 1 shows the layers grouped in accordance with color spectrums. Layers 10 include absorption layer 12, luminescent layer 14, reflective layer 15 and substrate layers 11 and 13, which implement display of a first color. Layers 20 include absorption layer 22, luminescent layer 24, reflective layer 25 and substrate layers 21 and 23, which implement display of a second color. Layers 30 include absorption layer 32, luminescent layer 34, reflective layer 35 and substrate layers 31 and 33, which implement display of a third color. For example, the first color is blue, the second color is green and the third color is red. Alternatively, the first color is red, the second color is green and the third color is blue. In general, the order of colors is a design choice based, for example, on the color absorption and reflectivity of chosen materials and desired optimization of performance of the display when the display operates using primarily ambient light and when the display operates using light generated from the luminescent layers.

Alternatively, the colors can be arranged in a different order or different colors can be used. While it is standard practice to use three primary colors to implement a color display, the present invention can be also be used to implement a display with one, two, four, five or more primary colors.

When ambient light is high, display 41 acts as a reflective display in which ambient light is selectively reflected to a user based on the wavelengths of light selectively absorbed by the absorption layers. Thus when there is sufficient ambient light, backlight 40 may not be needed to generate a display adequate for a user's needs. When backlight 40 is turned on, reflection of ambient light can be augmented by photoluminescent light generated within the luminescent layers under stimulation of the backlight. This photoluminescent light is selectively allowed to escape the display based on the wavelengths of light selectively absorbed by the absorption layers.

Figure 2:
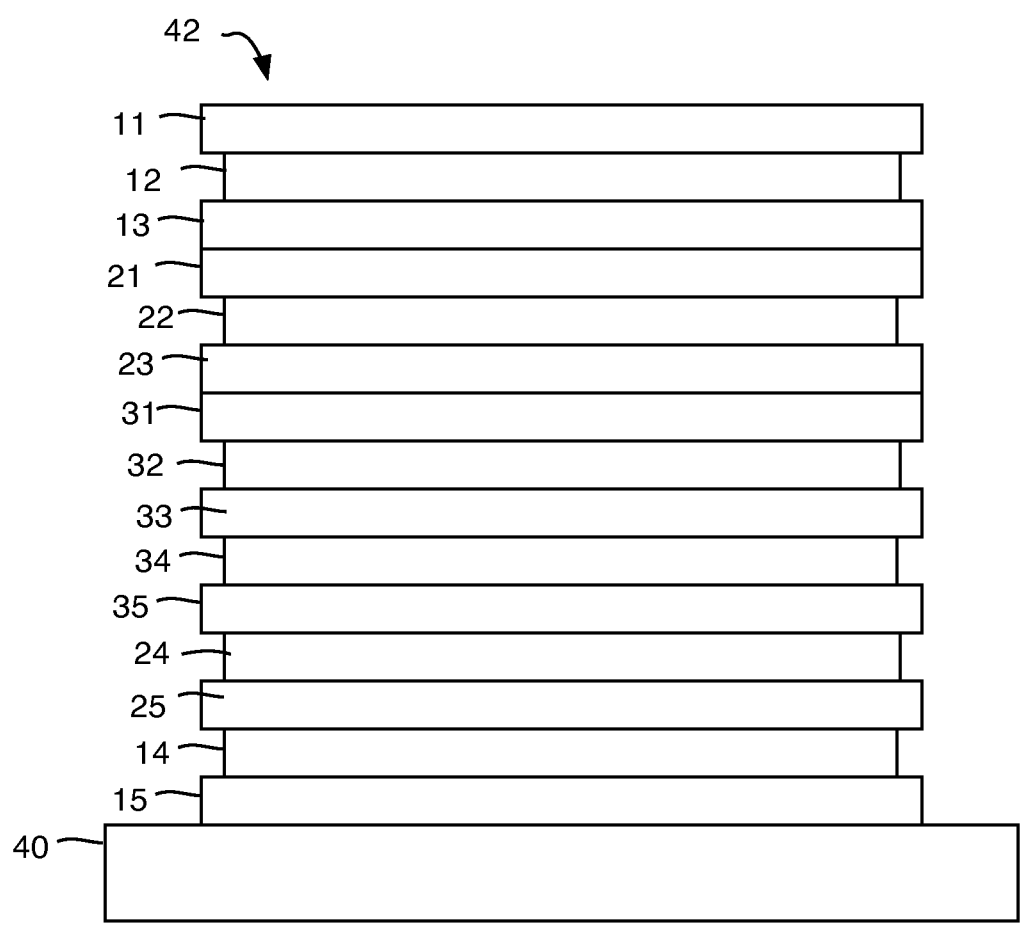
FIG. 2 is a schematic sectional view of a reflective display device in accordance with another embodiment of the present invention.

While FIG. 1 shows one stacking order, in alternative embodiments the layers are grouped in accordance with color spectrums and other schemes can be used to group layers. For example, FIG. 2 shows a reflective display device 42 with a different order of layers. As shown in FIG. 2, transparent conductive layer 11, absorption layer 12 and transparent conductive layer 13 are grouped at the top of reflective display device 42. Then are located transparent conductive layer 21, absorption layer 22 and transparent conductive layer 23, transparent conductive layer 31, absorption layer 32 and transparent conductive layer 33, as shown. Arranged below these layers are luminescent layer 34, reflective layer 35, luminescent layer 24, reflective layer 25, luminescent layer 14 and reflective layer 15. Alternatively, reflective layer 35, selective mirror 25 and selective mirror 15 could be replaced by a single broadband mirror placed below luminescent layer 14, luminescent layer 24 and luminescent layer 34.

In alternate embodiments, for example, luminescent layer 14, luminescent layer 24 and luminescent layer 34 are all located above reflective layer 15, reflective layer 25 and reflective layer 35 (or a single broadband mirror replacing reflective layers 15, 25 and 35) and all located below absorption layer 11, absorption layer 21 and absorption layer 31. For each color the luminescent layer is located below the corresponding absorption layer and is located above the corresponding reflective mirror.

We claim:

1. A display comprising:
 a backlight;
 a plurality of layers placed above the backlight for each wavelength band of a plurality of wavelength bands including a red wavelength band, a green wavelength band, and a blue wavelength band, the plurality of layers for each wavelength band including:
  an absorption layer to absorb light in the wavelength band to which the plurality of layers correspond while being substantially transparent to light in other wavelength bands,
  a luminescent layer to, in response to light of the backlight received from below the plurality of layers, emit light within the wavelength band; and
  a reflective layer below the luminescent layer to, in response to ambient light received from above the plurality of layers, reflect the received ambient light in the wavelength band to which the plurality of layers correspond,
 wherein the plurality of layers for a first wavelength band of the wavelength bands is disposed above the plurality of layers for a second wavelength band of the wavelength bands, which is disposed above the plurality of layers for a third wavelength band of the wavelength bands, such that the layers for the wavelength bands are organized by wavelength,
 wherein the display leverages the ambient light via the reflective layers and the backlight via the absorption layers.

2. A display as in claim 1 wherein the backlight emits one of ultraviolet light and deep blue light.

3. A display as in claim 1 wherein the wavelength bands include exactly three wavelength bands.

4. A display as in claim 1 wherein luminescent layer is polarized.

5. A display as in claim 1 wherein luminescent layer is polarized using dichroic luminescent dyes.

6. A display as in claim 1 wherein the absorption layer is an electro-optical layer.

7. A method for displaying comprising:
generating light with a backlight;
propagating the light from the backlight through a first reflective layer of a plurality of layers adapted to reflect light in a first wavelength band that is one of a red wavelength band, a green wavelength band, and a blue wavelength band;
emitting light within the first wavelength band from a first luminescent layer of the layers in response to the light from the backlight reaching the first luminescent layer;
propagating the emitted light within the first wavelength band to a first absorption layer of the layers capable of absorbing light in the first wavelength band while being substantially transparent to light in other wavelength bands, the first absorption layer absorbing or not absorbing the light in the first wavelength band dependent upon control signals;
emitting light within a second wavelength band that is a different one of the red wavelength band, the green wavelength band, and the blue wavelength band from a second luminescent layer of the layers in response to the light from the backlight reaching the second luminescent layer; and
propagating the emitted light within the second wavelength band to a second absorption layer of the layers capable of absorbing light in the second wavelength band while being substantially transparent to light in other wavelength bands, the second absorption layer absorbing or not absorbing the light in the second wavelength band dependent upon control signals,
wherein the plurality of layers are disposed above the backlight,
wherein the first reflective layer, the first luminescent layer, and the first absorption layer are disposed above the second luminescent layer and the second absorption layer,
and wherein the first absorption layer and the second absorption layer are interleaved with respect to one another within the layers, and the first luminescent layer and the second luminescent layer are interleaved with respect to one another within the layers.

8. A method as in claim 7, additionally comprising:
emitting light within the third wavelength band from a third luminescent layer in response to the light from the backlight reaching the third luminescent layer, and,
propagating the emitted light within the third wavelength band to a third absorption layer capable of absorbing light in the third wavelength band while being substantially transparent to light in other wavelength bands, the third absorption layer absorbing or not absorbing the light in the third wavelength band dependent upon control signals,
wherein the second luminescent layer and the second absorption layer are disposed above the third luminescent layer and the third absorption layer.

9. A method as in claim 8 wherein the first wavelength band, the second wavelength band, and third wavelength band comprise a blue wavelength band, a green wavelength band, and a red wavelength band.

10. A method as in claim 8 wherein each of the first luminescent layer, the second luminescent layer and the third luminescent layer is polarized.

11. A method as in claim 8 wherein each of the first luminescent layer, the second luminescent layer and the third luminescent layer is polarized using dichroic luminescent dyes.

12. A method as in claim 7 wherein the first absorption layer is an electro-optical layer.

13. A method as in claim 7 additionally comprising:
receiving ambient light through the first absorption layer to the first reflective layer; and,
reflecting the ambient light by the first reflective layer back through the first absorption layer.

14. The display of claim 1, wherein in a first mode of operation, the backlight is turned off, the absorption layer for each wavelength band absorbs ambient light originating external to the display, the reflective layer for each wavelength band reflects the ambient light absorbed by the absorption layer, and the luminescent layer for each wavelength band emits no light.

15. The display of claim 14, wherein in a second mode of operation, the backlight is turned on, the luminescent layer for each wavelength band emits light, the absorption layer for each wavelength band absorbs both light emitted by the luminescent layer and the ambient light originating external to the display, and the reflective layer for each wavelength band reflects the ambient light absorbed by the absorption layer.

* * * * *

UNITED STATES PATENT AND TRADEMARK OFFICE
CERTIFICATE OF CORRECTION

PATENT NO.       : 9,459,492 B2
APPLICATION NO.  : 13/643073
DATED            : October 4, 2016
INVENTOR(S)      : Adrian Derek Geisow et al.

Page 1 of 1

It is certified that error appears in the above-identified patent and that said Letters Patent is hereby corrected as shown below:

In the Claims

In Column 6, Line 4, in Claim 8, delete "layer," and insert -- layer; --, therefor.

Signed and Sealed this
Twenty-fifth Day of April, 2017

Michelle K. Lee
*Director of the United States Patent and Trademark Office*